Sept. 4, 1928.
E. C. NEWTON
1,682,850
TWO-PIECE PISTON RING
Filed Aug. 24, 1926
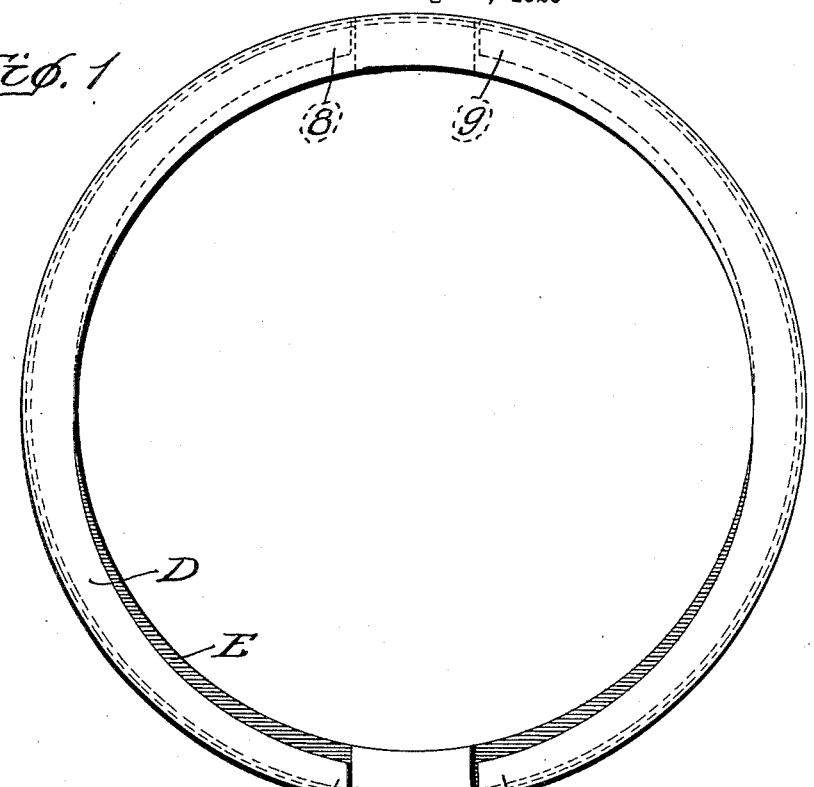
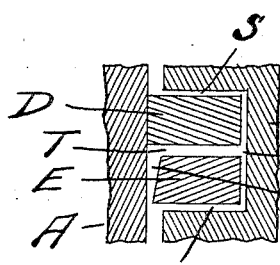
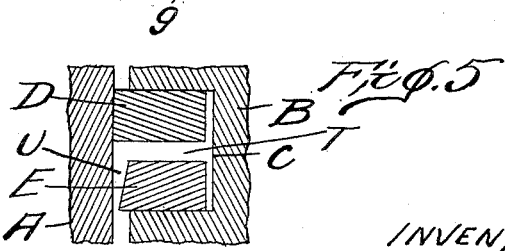
INVENTOR
EDWARD C. NEWTON,
by R. S. Berry
ATTORNEY.

Patented Sept. 4, 1928.

1,682,850

UNITED STATES PATENT OFFICE.

EDWARD C. NEWTON, OF LOS ANGELES, CALIFORNIA.

TWO-PIECE PISTON RING.

Application filed August 24, 1926. Serial No. 131,172.

This invention relates to two-piece piston rings and more particularly to a metallic packing, for use between a piston and a cylinder, which provides leakage upon relatively slow piston movements whereby engine starting, either by hand or mechanical "cranking", is facilitated, and which, upon relatively fast piston movements, as when the piston is moved by impulses from a combustible fuel, automatically provides a leak-tight joint between the piston and cylinder, whereby compression losses are minimized.

My primary object is to provide a piston packing of simple, durable and inexpensive construction which functions to offer minimum resistance to free piston movements at relatively slow piston speeds whereby to minimize effort in engine starting and to offer a sealed leak-tight joint between a piston and a cylinder at relatively high speed piston movements whereby compression losses are minimized.

A further object is to construct a piston packing having the above characteristics which will offer equalized pressure circumferentially of the cylinder.

And a still further object is to provide a ring which will function to remove excess lubrication from the cylinder on power strokes of the piston and uniformly distribute lubrication over the cylinder on return strokes of the piston.

My invention consists in the novel construction, arrangement and combination of parts, as hereinafter fully, clearly and concisely described, definitely pointed out in my claims and illustrated by the accompanying drawing (1 sheet) in which:—

Fig. 1 is a plan view of a ring embodying my improvements;

Fig. 2 is an elevation or edge-view, of the upper or compression ring element;

Fig. 3 is an elevation or edge view, of the lower or oil ring element;

Fig. 4 is an enlarged detail sectional elevation showing the relative positions of the two rings, at low-speed piston movements;

Fig. 5 is a view similar to Fig. 4 showing the ring positions at high speed piston movements.

Referring more specifically to the drawing, A designates the cylinder; B the piston and C the ring groove in the piston, which are all of conventional, standard, design.

My packing comprises two pieces or elements D and E, each constructed as a helix having free ends; whose external perimeters are circular; whose internal perimeters are substantially circular and eccentric to the external perimeters and which are provided with means for preventing relative circumferential or rotational movements when assembled and in use.

The ring or element D has, throughout its length or circumference, by preference, a quadrilateral section in which the several sides meet at right angles.

The ring or element E, has, throughout its length or circumference, by preference, a quadrilateral section in which the side forming the outer perimeter meets conterminous sides at acute angles.

The helical shape of the ring D provides, in its free ends, points 6 and 7, which tend to exert pressure in opposed directions, axially of the ring and similarly the ring E has in its free ends, points 8 and 9. In use, the points 6 and 9 bear respectively on opposed sides of the ring groove and the points 7 and 8 bear on contiguous sides of the rings to the end that there will be spaces or leaks, between the two rings and the walls of the ring groove and between the contiguous sides of the rings.

In Fig. 4 the rings are shown as related to each other and to the walls of the ring groove, as at a time when the engine is not running or when the piston is moving at a low speed, as upon starting, in which the referred to points 6 and 9 form leaks or spaces S, between the upper face of the ring D and the upper wall of the ring groove, and S' between the lower face of the ring E and the lower wall of the ring groove, and similarly, the points 7 and 8 of the rings bear upon the contiguous ring sides to form a space T.

As shown in Figs. 1, 4 and 5 the ring E has a diametrical dimension slightly less than the diametrical dimension of the ring D, whereby a space U is formed. Obviously, the combined spaces S, S', T and U provide leakage to the end that effort in engine starting is facilitated.

With the ring D, which at all times bears against the cylinder wall and the ring E spaced at all times from the cylinder wall, there will be, upon relatively high speed piston movements, a pressure built up on the lubricant scraped from the cylinder wall by the ring E and between the two rings in the space T which will overcome the tension of the helical spring-shape having the effect of enlarging the space T and decreasing or closing the spaces S and S', as shown, in Fig. 5, having the effect of making a leak-tight joint at the space S. This increasing of the space T also serves as an oil pocket which is filled by lubricant on the compression stroke and which carries the lubricant for distribution over the cylinder wall on the return stroke, in which the bevelled or inclined face of the lower ring E co-acts.

This movement of the two ring elements relative to each other and to the walls of piston grooves together with the movement of lubricant over all the surfaces of the groove and rings prevents lodgement of foreign matter, such as carbon, and assures full and constant lubrication of all surfaces of the packing to the end that wear of the ring and groove surfaces is minimized and "sticking," ordinarily termed "freezing" is obviated.

I claim:—

1. A piston packing comprising a compression ring having a cylindrical outer perimeter and opposed yielding points, and an oil ring having a lesser diametrical dimension than the compression ring, having a conical outer perimeter and opposed yielding points.

2. A piston packing comprising a pair of helical rings of differing diameters, the outer perimeter of one of which is cylindrical and the outer perimeter of the other of which is conical, each of said rings having spaced ends, and each one of said rings having means for engagement with the ends of the other ring to prevent relative rotational movements.

3. A piston packing comprising a pair of helical rings of differing diameters, the outer perimeter of one of which is cylindrical and the outer perimeter of the other of which is conical, the inner perimeters of the rings being relatively eccentric, and means for holding the rings against relative rotational movements.

4. A piston packing comprising a compression ring and an oil ring, each having yielding parts for holding the two rings relatively spaced and spaced from the walls of a ring groove.

5. A piston packing comprising a compression ring and an oil ring, each having yielding parts for holding the two rings relatively spaced and spaced from the walls of a ring groove, the outer perimeter of the oil ring being conical.

6. A packing comprising a compression ring of helical form and of right angled quadrilateral section, the free ends of which occupy planes removed from the plane of the body thereof, and an oil ring of helical form and of acute angled quadrilateral section, the free ends of which occupy planes removed from the plane of the body thereof.

7. A packing comprising a compression ring of helical form and of right angled quadrilateral section, the free ends of which occupy planes removed from the plane of the body thereof, an oil ring of helical form and of acute angled quadrilateral section, the free ends of which occupy planes removed from the plane of the body thereof, said compression ring having a circular outer perimeter and a substantially circular inner perimeter which is eccentric to its outer perimeter, and means for holding the two rings against relative rotational movements.

8. A packing comprising a compression ring of helical form and of right angled quadrilateral section, the free ends of which occupy planes removed from the plane of the body thereof, an oil ring of helical form and of acute angled quadrilateral section, the free ends of which occupy planes removed from the plane of the body thereof, said compression ring having a circular outer perimeter and a substantially circular inner perimeter which is eccentric to its outer perimeter, means for holding the two rings against relative rotational movements, said oil ring having a slightly smaller external diameter than said compression ring.

In witness whereof, I hereunto affix my signature.

EDWARD C. NEWTON.